US012638742B2

(12) United States Patent
Lee et al.

(10) Patent No.: US 12,638,742 B2
(45) Date of Patent: May 26, 2026

(54) LIGHT PATH CONTROL MEMBER, AND DISPLAY DEVICE INCLUDING SAME

(71) Applicant: LG Display Co., Ltd., Seoul (KR)

(72) Inventors: Sanghyun Lee, Paju-si (KR); Minsoo Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 276 days.

(21) Appl. No.: 18/508,708

(22) Filed: Nov. 14, 2023

(65) Prior Publication Data

US 2024/0192564 A1 Jun. 13, 2024

(30) Foreign Application Priority Data

Dec. 12, 2022 (KR) ........................ 10-2022-0172546

(51) Int. Cl.
*G02F 1/167* (2019.01)
*G02F 1/13* (2006.01)
*G02F 1/1677* (2019.01)

(52) U.S. Cl.
CPC ............ *G02F 1/167* (2013.01); *G02F 1/1323* (2013.01); *G02F 1/1677* (2019.01)

(58) Field of Classification Search
CPC ....... G02F 1/167; G02F 1/1323; G02F 1/1677
See application file for complete search history.

(56) References Cited

U.S. PATENT DOCUMENTS

| | | | |
|---|---|---|---|
| 2005/0179619 A1 | 8/2005 | Cornelissen et al. | |
| 2020/0050010 A1* | 2/2020 | Zheng ..................... | G02B 27/46 |
| 2021/0389614 A1 | 12/2021 | Hosseini et al. | |

FOREIGN PATENT DOCUMENTS

| | | |
|---|---|---|
| JP | 2012088486 A | 5/2012 |
| KR | 20050007318 A | 1/2005 |
| KR | 101257931 B1 | 4/2013 |
| KR | 20170085816 A | 7/2017 |
| KR | 20210013854 A | 2/2021 |
| KR | 20210043194 A | 4/2021 |
| KR | 102277206 B1 | 7/2021 |

* cited by examiner

*Primary Examiner* — James A Dudek
(74) *Attorney, Agent, or Firm* — Seed Intellectual Property Law Group LLP

(57) ABSTRACT

A light path control member according to an embodiment includes a first substrate; a first electrode disposed on the first substrate; a light conversion unit disposed on the first electrode; a second substrate disposed on the light conversion unit; a second electrode disposed between the second substrate and the light conversion unit; and a barrier disposed on an upper surface of the second substrate.

19 Claims, 16 Drawing Sheets

LIGHT PATH CONTROL MEMBER, AND DISPLAY DEVICE INCLUDING SAME

CROSS-REFERENCE TO RELATED APPLICATION

The present application claims priority to Korean Patent Application No. 10-2022-0172546, filed Dec. 12, 2022, the entire contents of which is incorporated herein for all purposes by this reference.

BACKGROUND

Technical Field

The disclosure relates to a light path control member and a display device including the same.

Description of the Related Art

A light-shielding film shields transmitting of light from a light source, and is attached to a front surface of a display panel which is a display device used for a mobile phone, a notebook, a tablet PC, a vehicle navigation device, a vehicle touch, etc., so that the light-shielding film adjusts a viewing angle of light according to an incident angle of light to express a clear image quality at a viewing angle needed by a user when the display transmits a screen.

In addition, the light-shielding film may be used for the window of a vehicle, building or the like to shield outside light partially to prevent glare, or to prevent the inside from being visible from the outside.

That is, the light-shielding film may be a light path conversion member that controls the movement path of light, blocks light in a specific direction, and transmits light in a specific direction.

BRIEF SUMMARY

An object to be solved by the disclosure is to provide a light path control member capable of switching between a first mode (share mode) and a second mode (privacy mode).

Another object to be achieved by the disclosure is to provide a display device including a light path control member capable of switching between a first mode (share mode) and a second mode (privacy mode).

The technical object to be achieved by the disclosure is not limited to the above-mentioned technical object, and other technical objects not mentioned can be clearly understood by those skilled in the art from the description below.

In order to achieve the above object, a light path control member according to an embodiment includes a first substrate; a first electrode disposed on the first substrate; a light conversion unit disposed on the first electrode; a second substrate disposed on the light conversion unit; a second electrode disposed between the second substrate and the light conversion unit; and a barrier disposed on an upper surface of the second substrate.

In order to achieve another object above, a display device according to an embodiment includes a display panel; and a light path control member on the display panel, wherein the light path control member includes a first substrate, a first electrode disposed on the first substrate, a light conversion unit disposed on the first electrode, a second substrate disposed on the light conversion unit, a second electrode disposed between the second substrate and the light conversion unit, and a barrier disposed on an upper surface of the second substrate.

Other details of embodiments are included in detailed descriptions and drawings.

According to the light path control member and the display device according to embodiments, switching between the first mode (share mode) and the second mode (privacy mode) may be possible.

Furthermore, the front transmittance may be increased by using a difference in refractive indexes between the light transmission part and light path variable part of the light conversion unit.

The effects of the embodiments are not restricted to the one set forth herein, and more various effects are included in the specification.

DETAILED DESCRIPTION

Figure 1:
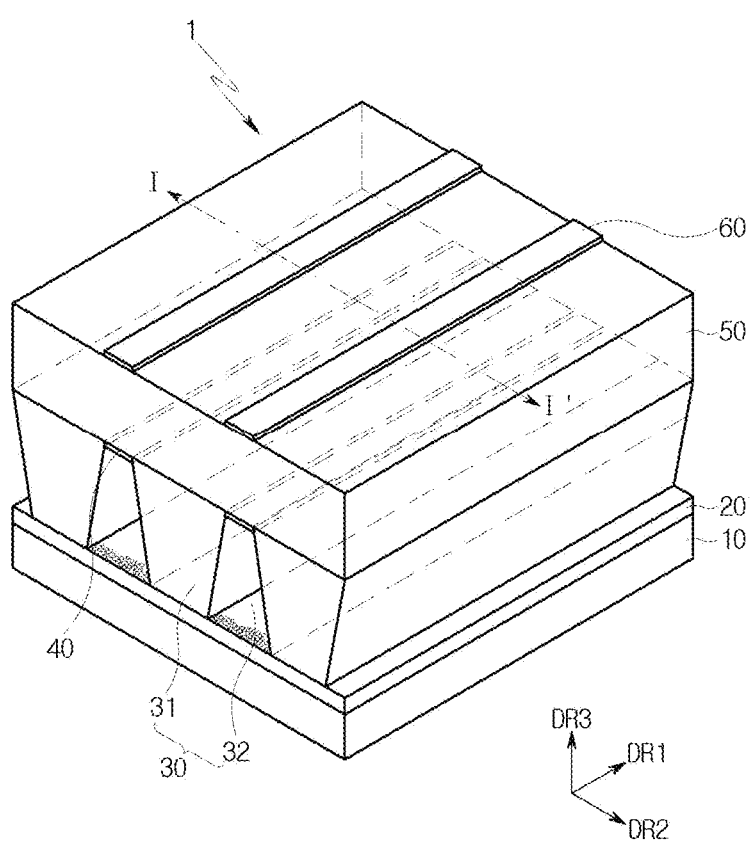
FIG. 1 is a perspective view of a light path control member according to an embodiment.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided to completely disclose the disclosure and inform those skilled in the art of the scope of the disclosure.

Cases where elements or layers are referred to as being located "on" other elements or layers include all the cases where other layers or other elements are interposed directly on or between other elements. Same reference numerals refer to the same constituent elements throughout the specification. The shapes, sizes, ratios, angles, numbers, and the like, inscribed in the drawings to illustrate embodiments are illustrative only, and the disclosure is not limited to the illustrated in the drawings.

It will be understood that, although the terms first, second, etc., may be used herein to describe various elements, these elements should not be limited by these terms. These terms are only used to distinguish one element from another element. Thus, a first element discussed below could be termed a second element without departing from the teachings of the present invention.

Features of various embodiments of the disclosure may be partially or overall coupled to or combined with each other, and may be variously inter-operated with each other and driven technically. The embodiments of the disclosure may be carried out independently from each other, or may be carried out together in co-dependent relationship.

Exemplary embodiments will hereinafter be described in detail with reference to the accompanying drawings.

Figure 2:
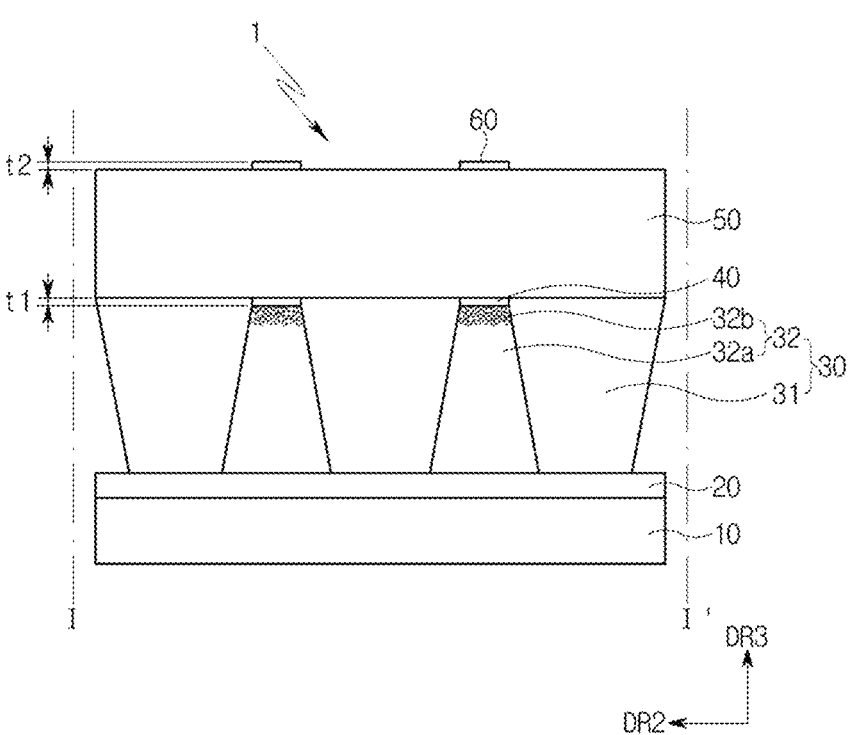
FIG. 2 is a cross-sectional view taken along the line I-I' in FIG. 1.
Figure 3:
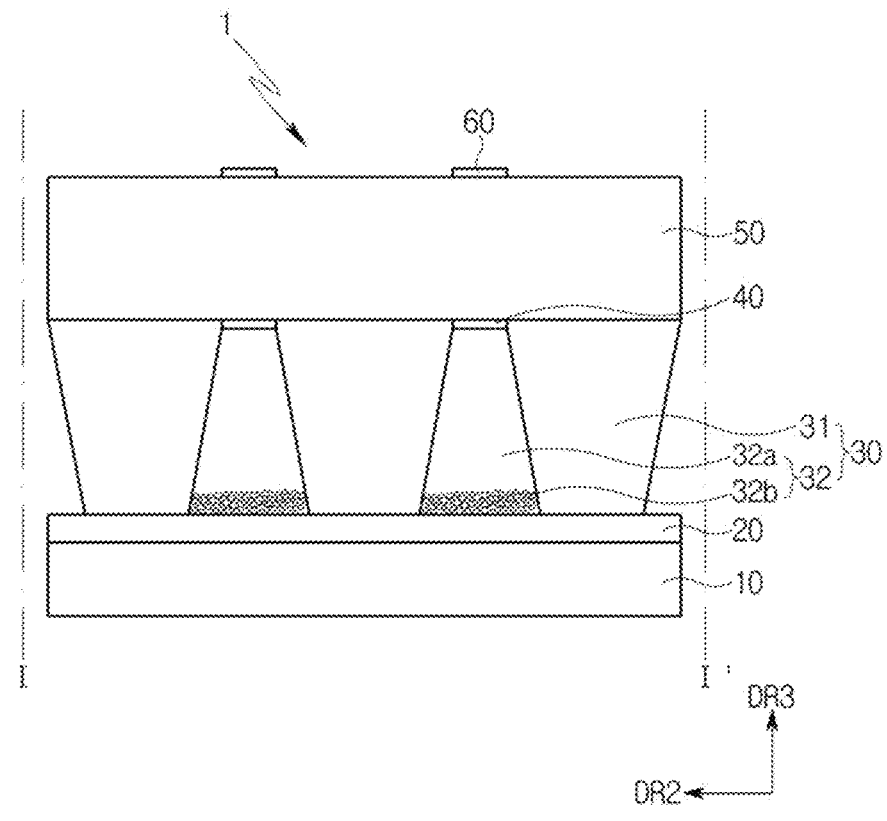
FIG. 3 is a cross-sectional view illustrating second and third modes of the light path control member in FIG. 1.

FIG. 1 is a perspective view of a light path control member according to an embodiment. FIG. 2 is a cross-sectional view taken along the line I-I' in FIG. 1. FIG. 3 is a cross-sectional view illustrating second and third modes of the light path control member in FIG. 1.

Referring to FIGS. 1 to 3, a light path control member 1 according to an embodiment may include a first substrate 10, a first electrode 20 on the first substrate 10, a light conversion unit 30 on the first electrode 20, a second electrode 40 on the light conversion unit 30, a second substrate 50 on the second electrode 40, and a barrier 60 on the second substrate 50. The light conversion unit 30 may be disposed between the first electrode 20 and the second electrode 40.

The first substrate 10 may support the first electrode 20. The first substrate 10 may be rigid or flexible.

Also, the first substrate 10 may be transparent. For example, the first substrate 10 may include a transparent substrate capable of transmitting light.

The first substrate 10 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example and is not necessarily limited thereto.

Also, the first substrate 10 may be a flexible substrate having flexible characteristics.

Also, the first substrate 10 may be a curved or bent substrate. That is, the light path control member including the first substrate 10 may also be formed to have flexible, curved or bended characteristics. For this reason, the light path control member according to an embodiment may be changed into various designs.

The first substrate 10 may have a thickness of about 1 mm or less.

The first electrode 20 may be disposed on one surface of the first substrate 10. More specifically, the first electrode 20 may be disposed on the upper surface of the first substrate 10. That is, the first electrode 20 may be disposed between the first substrate 10 and the second substrate 50.

The first electrode 20 may include a transparent conductive material. For example, the first electrode 20 may include a metal oxide such as indium tin oxide, indium zinc oxide, copper oxide, tin oxide, zinc oxide, titanium oxide.

The light transmittance of the first electrode 20 may be about 80% or more. More specifically, the first electrode 20 may be disposed on the entire surface of one surface of the first substrate 10. That is, the first electrode 20 may be disposed as a surface electrode on the first substrate 10.

The first electrode 20 may have a thickness of about 10 nm to about 50 nm.

Alternatively, the first electrode 20 may include various metals to implement low resistance. For example, the first electrode 20 may include at least one metal selected from chromium (Cr), nickel (Ni), copper (Cu), aluminum (Al), silver (Ag), molybdenum (Mo), gold (Au), titanium (Ti), and alloys thereof.

The first electrode 20 may be disposed on the entire surface of one surface of the first substrate 10. More specifically, the first electrode 20 may be disposed as a surface electrode on one surface of the first substrate 10. However, an embodiment is not limited thereto, and the first electrode 20 may be formed of a plurality of patterned electrodes having a predetermined pattern.

The second substrate 50 may be disposed on the first substrate 10. The second substrate 50 may face the first substrate 10.

The second substrate 50 may include a material capable of transmitting light. The second substrate 50 may include a transparent material. The second substrate 50 may include the same or similar material as the first substrate 10 described above.

For example, the second substrate 50 may include glass, plastic, or a flexible polymer film. For example, the flexible polymer films may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example and is not necessarily limited thereto.

Also, the second substrate 50 may be a flexible substrate having flexible characteristics.

Also, the second substrate 50 may be a curved or bent substrate. That is, the light path control member including the second substrate 50 may also be formed to have flexible, curved or bended characteristic. For this reason, the light path control member according to an embodiment may be changed into various designs.

The second substrate 50 may have a thickness of about 1 mm or less.

The second electrode 40 may be disposed on one surface of the second substrate 50. More specifically, the second electrode 40 may be disposed on the lower surface of the second substrate 50. That is, the second electrode 40 may be disposed on a surface of the second substrate 50 facing the first substrate 10. Specifically, the second electrode 40 may be disposed facing the first electrode 20 on the first substrate 10. Thus, the second electrode 40 may be disposed between the first electrode 20 and the second substrate 50.

The second electrode 40 may be disposed on the lower surface of the second substrate 50. The second electrode 40 may be provided in plurality. The second electrode 40 extends along the first direction DR1 and the plurality of second electrodes 40 may be spaced apart from each other along the second direction DR2.

The second electrode 40 may include a light absorbing material. A predetermined voltage may be applied to the second electrode 40 in a first mode and a second mode, respectively, in order to form an electric field in a light path variable part 32 to be described later. The second electrode 40 may include a conductive material in order to form an electric field by applying a predetermined voltage in the first mode and the second mode, respectively. The conductive material of the second electrode 40 may include metal or conductive oxide. Examples of the metal include, but are not limited to, chromium (Cr), nickel (Ni), copper (Cu), aluminum (Al), silver (Ag), molybdenum (Mo), gold (Au), titanium (Ti), alloys thereof, or the like. Examples of the conductive oxide include, but are not limited to, transparent conductive materials such as indium-tin oxide (ITO), indium-zinc oxide (IZO), and indium-gallium-zinc oxide (IGZO).

As described above, the second electrode 40 may function as a light-shielding unit like the barrier 60 by including a light absorbing material. That is, the second electrode 40 may be an opaque metal, or the light absorbing material may be formed on a surface of the conductive material or conductive oxide. The second electrode 40 may have a first thickness t1. The first thickness t1 may be about 30 nm to about 50 nm.

In some embodiments, the first thickness t1 of the second electrode 40 may be smaller than the second thickness t2 of the barrier 60.

The barrier 60 may be disposed on the other surface of the second substrate 50. More specifically, the barrier 60 may be disposed on the upper surface of the second substrate 50. That is, the barrier 60 may be disposed on a surface opposite to the surface of the second substrate 50 facing the first substrate 10. Thus, the barrier 60 may be spaced apart from the second electrode 40 with the second substrate 50 therebetween.

The barrier 60 may be provided in plurality. The barrier 60 extends along the first direction DR1 and the plurality of barriers 60 may be spaced apart from each other along the second direction DR2. Each of the plurality of barriers 60 may overlap the second electrodes 40 below the barriers 40 in the thickness direction.

The barrier 60 may include a light absorbing material. The barrier 60 may serve to narrow a side viewing angle in a second mode to be described later. The barrier 60 is similar to the second electrode 40 in that the barrier includes the light absorbing material and the second electrode 40 includes the light absorbing material, but the barrier 60, unlike the second electrode 40, may not include a conductive material.

The barrier 60 may have a second thickness t2. The second thickness t2 may be about 30 nm to about 50 nm. The second thickness t2 may be the same as the first thickness t1.

Like some of the above-described embodiments, the first thickness t1 may be smaller than the second thickness t2. That is, in the case that the light path control member 1 widens the side viewing angle in the first mode, the light absorbing particles 32b of the light path variable part 32 are disposed adjacent to the second electrode 40, the light absorbing particles 32b and the second electrode 40 may absorb the side light and prevent widening the side viewing angle. To prevent this, the thickness t1 of the second electrode 40 is formed to be smaller than the thickness t2 of the barrier 60, so that in the first mode, it is possible to prevent the light absorbing particles 32b and the second electrode 40 from absorbing side light, thereby preventing the widening of the side viewing angle in advance.

The light conversion unit 30 may be disposed between the first substrate 10 and the second substrate 50. In more detail, the light conversion unit 30 may be disposed between the first electrode 20 and the second electrode 40.

The light conversion unit 30 may include a light transmission part 31 and a light path variable part 32 around the light transmission part 31. The positions of the light absorbing particles 32b may be changed in the light path variable part 32 according to the application of voltage. The light transmission part 31 may be disposed between adjacent light path variable parts 32. The light path variable part 32 may overlap the second electrode 40. The light path variable part 32 may be provided in plurality. Each of the plurality of light path variable parts 32 may extend along the first direction DR1 and be spaced apart from each other in the second direction DR2. Each of the plurality of light path variable parts 32 may overlap the second electrodes 40. The sum of the thickness of the light path variable part 32 and the thickness t1 of the second electrode 40 may be equal to the thickness of the light transmitting part 31.

For example, the cross-sectional shape of the light path variable part 32 may be a trapezoidal shape. That is, in the light path variable part 32, the width of the upper surface may be smaller than the width of the lower surface.

The light transmission part 31 may include an opening. A cross-sectional shape of the opening may be the same as that of the light path variable part 32. The cross-sectional shape of the opening is not limited thereto, and may be an inverted trapezoidal shape, a rectangular shape, a square shape, or other polygonal shape.

The opening may be formed from a surface of the light transmission part 31.

Side surfaces of the light path variable part 32 may directly contact the adjacent light transmission part 31. An upper surface of the light path variable part 32 may contact the second electrode 40 and a lower surface of the light path variable part 32 may contact the first electrode 20. The lower surface of the light transmission part 31 may contact the first electrode 20 and the upper surface of the light transmission part 31 may contact the second substrate 50. The light transmission part 31 may contact a side surface of the second electrode 40.

The light path variable part 32 may include a dispersion solution 32a and the light absorbing particles 32b. More specifically, the light path variable part 32 is added and filled with the dispersion solution 32a, and the plurality of light absorbing particles 32b may be dispersed in the dispersion solution 32a.

The dispersion solution 32a may be a material that disperses the light absorbing particles 32b. The dispersion solution 32a may include a transparent material. The dispersion solution 32a may include a non-polar solvent. In addition, the dispersion solution 32a may include a material capable of transmitting light. For example, the dispersion solution 32a may include at least one of halocarbon-based oil, paraffin-based oil, and isopropyl alcohol.

The light absorbing particles 32b may be dispersed and disposed in the dispersion solution 32a. More specifically, the plurality of light absorbing particles 32b may be spaced apart from each other and disposed in the dispersion solution 32a.

The light absorbing particles 32b may include a material capable of absorbing light. The light absorbing particles may have a color. More specifically, the light absorbing particles 32b may include black particles capable of absorbing light. For example, the light absorbing particles may include carbon black particles.

The light transmission part 31 may transmit light provided from a lower part to an upper part. The light transmission part 31 may include a transparent material. The light transmission part 31 may include a material capable of transmitting light.

The light transmission part 31 may transmit light incident to one of the first substrate 10 and the second substrate 50 toward the other substrate.

Hereinafter, a mode with a wide side viewing angle illustrated in FIGS. 2 and 4 will be referred to as a first mode, and a mode with a limited side viewing angle illustrated in FIGS. 3 and 5 will be referred to as a second mode. The third mode may have the same light path variable part 32 as the second mode.

As illustrated in FIG. 3, the light path variable part 32 has a line shape extending along the first direction DR1 and may be provided in plurality. The plurality of light path variable parts 32 may be spaced apart from each other and disposed along the second direction DR2.

The switching from the first mode to the second mode may be implemented by moving the light absorbing particles 32b of the light path variable part 32. That is, the light absorbing particles 32b have charges on their surfaces, and may move in the direction of the first electrode or the second electrode according to the characteristics of the charges in the application of voltage. That is, the light absorbing particles 32b may be electrophoretic particles.

In the first mode, the light absorbing particles 32b may be disposed adjacent to the second electrode 40. To this end, in the first mode, a (+) voltage may be applied to the second electrode 40 and a (−) voltage may be applied to the first electrode 20. The surfaces of the light absorbing particles 32b are charged with (−) charge, and in the first mode, a repulsive force is formed with respect to the first electrode 20 and an attractive force is formed with respect to the second electrode 40, so that the light absorbing particles 32b may be disposed adjacent to the second electrode 40.

In the second mode, the light absorbing particles 32b may be disposed adjacent to the first electrode 20. To this end, in the second mode, a (−) voltage may be applied to the second electrode 40 and a (+) voltage may be applied to the first electrode 20. The surfaces of the light absorbing particles 32b are charged with (−) charge, and in the second mode, an attractive force is formed with respect to the first electrode 20 and a repulsive force is formed with respect to the second electrode 40, so that the light absorbing particles may be disposed adjacent to the first electrode 20.

In the specification, the meaning that the light absorbing particles 32b are disposed adjacent to the electrodes 20 and 40 in each mode is that based on the thickness of the light path variable part 32, about 80% or more of the light absorbing particles 32b are placed in an area of 30% or less of the separation distance between the first electrode 20 and the second electrode 40. For example, in the first mode, about 80% or more of the light absorbing particles 32b are disposed in an area from the second electrode 40 to a first distance in the thickness direction, and the first distance may be 30% or less of the thickness of the light path variable part 32 (or separation distance between the first electrode 20 and the second electrode 40). In the second mode, about 80% or more of the light absorbing particles 32b are disposed in an area from the first electrode 20 to a second distance in the thickness direction, and the second distance may be 30% or less of the thickness of the light path variable part 32 (or separation distance between the first electrode 20 and the second electrode 40).

Meanwhile, the light path variable part 32 according to an embodiment may maintain the second mode in the third mode, that is, a mode in which no voltage is applied to the respective electrodes 20 and 40. That is, in the third mode, the light absorbing particles 32b may be disposed adjacent to the first electrode 20. In order to maintain the second mode in the third mode, the light path variable part 32 may further include an additive forming an electrical attraction with the (−) charged light absorbing particles 32b.

Hereinafter, the light path control function of the light path control member in each mode will be described.

Figure 4:
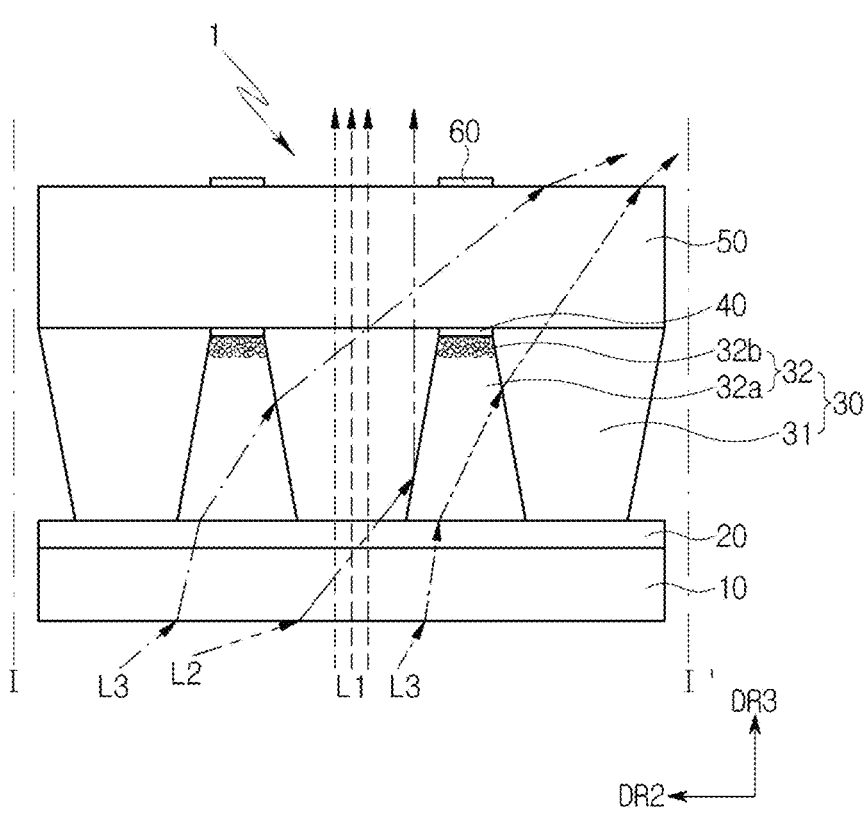
FIG. 4 is a schematic view illustrating a light path in a first mode.
Figure 6:
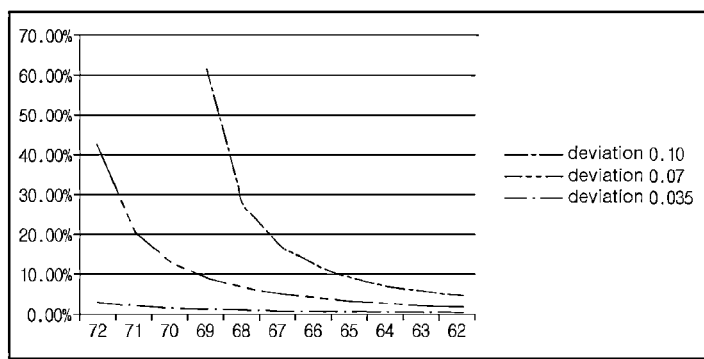
FIG. 6 is a graph illustrating an incidence angle of light (S-polarized light) incident from a light transmission part to a light path variable part and a reflectance of the light due to a difference in refractive index between the light transmission part and the light path variable part.
Figure 7:
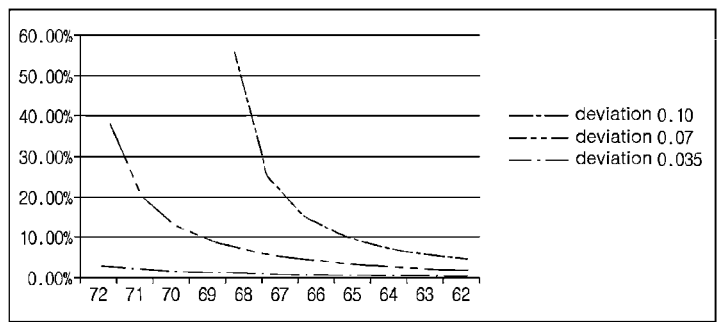
FIG. 7 is a graph illustrating an incidence angle of light (P-polarized light) incident from a light transmission part to a light path variable part and a reflectance of the light due to a difference in refractive index between the light transmission part and the light path variable part.
Figure 8A:
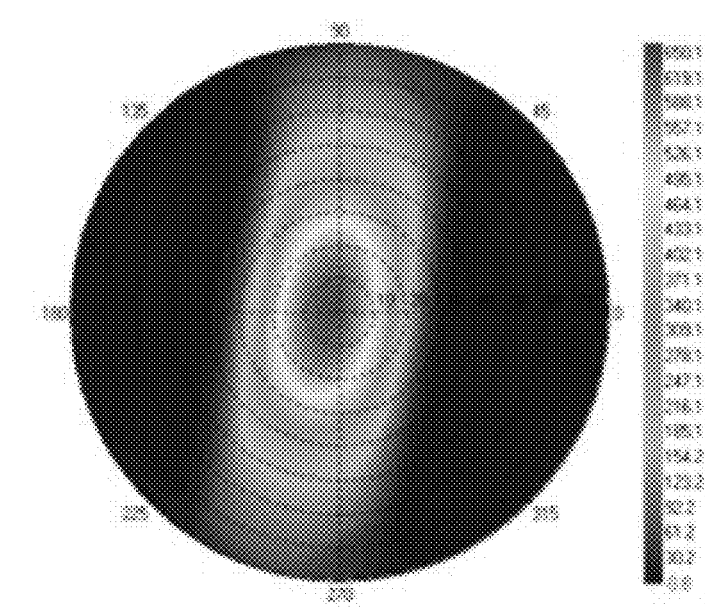
FIGS. 8(a) and 8(b) are views illustrating front transmittance in a second mode and a first mode, respectively.
Figure 8B:
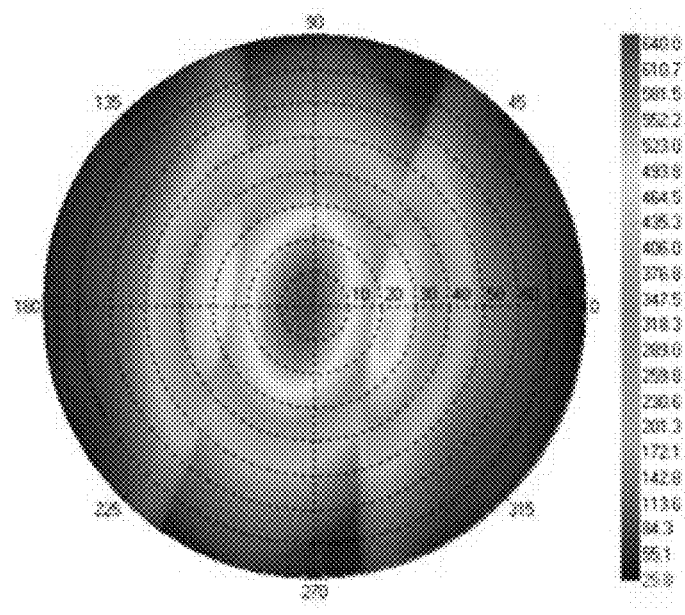

FIG. 4 is a schematic view illustrating a light path in a first mode. FIG. 5 is a schematic view illustrating light paths in a second mode and a third mode. FIG. 6 is a graph illustrating an incidence angle of light (S-polarized light) incident from a light transmission part to a light path variable part and a reflectance of the light due to a difference in refractive index between the light transmission part and the light path variable part. FIG. 7 is a graph illustrating an incidence angle of light (P-polarized light) incident from a light transmission part to a light path variable part and a reflectance of the light due to a difference in refractive index between the light transmission part and the light path variable part. FIGS. 8(a) and 8(b) are views illustrating front transmittance in a second mode and a first mode, respectively.

As illustrated in FIG. 4, in the first mode, the light L1 incident on the light transmitting part 31 through the first substrate 10 and the first electrode 20 is emitted to the upper part of the second substrate 50 as it is. The light L2 incident from the light transmission part 31 to the side surface of the light path variable part 32 is totally reflected at the interface between the light path variable part 32 and the light transmission part 31, and is emitted to the upper part of the second substrate 50. The light L3 incident from the side surface of the light path variable part 32 to the light transmission part 31 is refracted to the side surface at the interface between the light path variable part 32 and the light transmission part 31 and may proceed in a lateral direction.

In order that the light L2 incident from the light transmission part 31 to the side surface of the light path variable part 32 is totally reflected at the interface between the light path variable part 32 and the light transmission part 31, and the light L3 incident from the side surface of the light path variable part 32 to the light transmission part 31 is refracted to the side surface at the interface between the light path variable part 32 and the light transmission part 31 to proceed in the lateral direction, the refractive indexes of the light path variable part 32 and light transmission part 31 need to be adjusted. In particular, since the light absorbing particles 32b in the light path variable part 32 are a material that absorbs light, it may be the dispersion solution 32a whose refractive index is to be adjusted.

In order that the light L2 incident from the light transmission part 31 to the side surface of the light path variable part 32 is totally reflected at the interface between the light path variable part 32 and the light transmission part 31, and the light L3 incident from the side surface of the light path variable part 32 to the light transmission part 31 is refracted to the side surface at the interface between the light path variable part 32 and the light transmission part 31 to proceed in the lateral direction, the refractive index of the light transmission part 31 should be greater than the refractive index of the dispersion solution 32a. For example, the refractive index of the light transmission part 31 may be about 0.08 greater than the refractive index of the dispersion solution 32a. In some embodiments, the refractive index of the light transmission part 31 may be about 1.0 or more than the refractive index of the dispersion solution 32a.

FIG. 6 and Table 1 and FIG. 7 and Table 2 show the incident angle of the light (S-polarized light) incident from the light transmission part 31 to the light path variable part 32 and the reflectance of the light due to the difference in the refractive indexes of the light transmission part 31 and light path variable part 32.

TABLE 1

| $\Theta i$ | $\Delta n$ 0.10 | $\Delta n$ 0.07 | $\Delta n$ 0.035 |
|---|---|---|---|
| 72 | Total reflection | 42.08% | 2.85% |
| 71 | Total reflection | 20.74% | 2.14% |
| 70 | Total reflection | 13.01% | 1.65% |
| 69 | 60.70% | 8.99% | 1.30% |
| 68 | 27.19% | 6.57% | 1.04% |
| 67 | 17.14% | 4.99% | 0.85% |
| 66 | 12.00% | 3.90% | 0.70% |
| 65 | 8.90% | 3.12% | 0.59% |

TABLE 2

| $\Theta i$ | $\Delta n$ 0.10 | $\Delta n$ 0.07 | $\Delta n$ 0.035 |
|---|---|---|---|
| 72 | Total reflection | 38.46% | 2.11% |
| 71 | Total reflection | 17.37% | 1.50% |
| 70 | Total reflection | 10.14% | 1.09% |
| 69 | 56.41% | 6.54% | 0.81% |
| 68 | 22.14% | 4.46% | 0.61% |
| 67 | 12.71% | 3.15% | 0.47% |
| 66 | 8.16% | 2.29% | 0.36% |
| 65 | 5.55% | 1.69% | 0.28% |

First, referring to FIG. 6 and Table 1, in the case that the deviation (or difference) between the refractive index of the light transmission part 31 and the refractive index of the dispersion solution 32a is 0.1 or more, it can be confirmed that total reflection occurs at the interface between the light transmission part 31 and the dispersion solution 32a, compared to the case of the deviation of 0.07 or 0.035.

Similarly, referring to FIG. 7 and Table 2, in the case that the deviation (or difference) between the refractive index of the light transmission part 31 and the refractive index of the dispersion solution 32a is 0.1 or more, it can be confirmed that total reflection occurs at the interface between the light transmission part 31 and the dispersion solution 32a, compared to the case of the deviation of 0.07 or 0.035.

According to an embodiment, in the case of the light path control member 1, the deviation (or difference) between the refractive index of the light transmission part 31 and the refractive index of the dispersion solution 32a is 0.1 or more, so that the light L2 incident from the light transmission part 31 to the side surface of the light path variable part 32 is totally reflected at the interface between the light path variable part 32 and the light transmission part 31, and the light L3 incident from the side surface of the light path variable part 32 to the light transmission part 31 is refracted to the side surface at the interface between the light path variable part 32 and the light transmission part 31 and proceeds in the lateral direction, whereby the front light emission efficiency can be maximized in the first mode.

Figure 5:
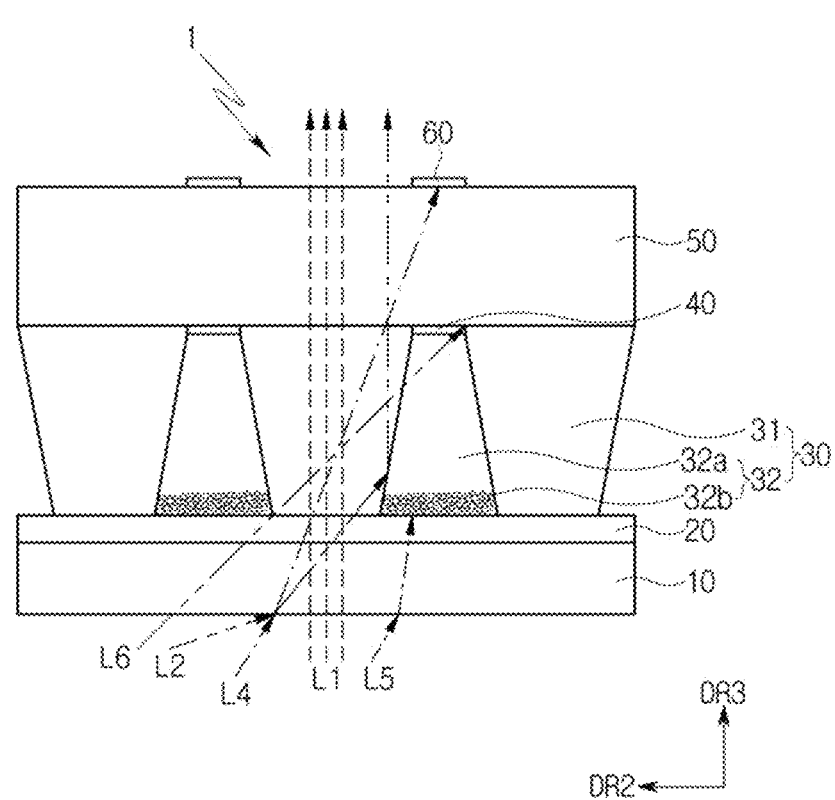
FIG. 5 is a schematic view illustrating light paths in a second mode and a third mode.

As illustrated in FIG. 5, in the second mode (or third mode), the light L1 incident to the light transmitting part 31 through the first substrate 10 and the first electrode 20 may be emitted to the upper part of the second substrate 50 as it is. The light L2 incident from the light transmission part 31 to the side surface of the light path variable part 32 may be totally reflected at the interface between the light path variable part 32 and the light transmission part 31. The light L4 incident from the light transmission part 31 to the barrier 60 may be absorbed by the barrier 60, the light L5 incident on the lower part of the light path variable part 32 may be absorbed by the light absorbing particles 32b disposed adjacent to the first electrode 20, and the light L6 incident on the second electrode 40 may be absorbed by the second electrode 40.

Even in the second mode (or third mode), the deviation (or difference) between the refractive index of the light transmission part 31 and the refractive index of the dispersion solution 32a is 0.1 or more, so that the light L2 incident from the light transmission part 31 to the side surface of the light path variable part 32 is totally reflected at the interface between the light path variable part 32 and the light transmission part 31, thereby maximizing front light emission efficiency.

FIGS. 8(a) and 8(b) illustrate the front light emission efficiency in the second mode (or third mode) and the front light emission efficiency in the first mode, respectively.

Referring to FIGS. 8(a) and 8(b), the front light emission efficiency in the second mode (or third mode) and the front light emission efficiency in the first mode may be 70% or more, respectively. The reason why the front light emission efficiency in the second mode (or third mode) and the front light emission efficiency in the first mode are 70% or more is that, as described above, in the first mode or the second mode (or third mode), the deviation (or difference) between the refractive index of the light transmission part 31 and the refractive index of the dispersion solution 32a is 0.1 or more, so that the light incident from the light transmission part 31 to the side surface of the light path variable part 32 is totally reflected at the interface between the light path variable part 32 and the light transmitting part 31, thereby maximizing front light emission efficiency.

Meanwhile, as described above, the second electrode 40 may have a first thickness t1. The first thickness t1 may be about 30 nm to about 50 nm.

In some embodiments, the first thickness t1 of the second electrode 40 may be smaller than the second thickness t2 of the barrier 60.

Hereinafter, other embodiments of the light path control member 1 will be described.

Figure 9:
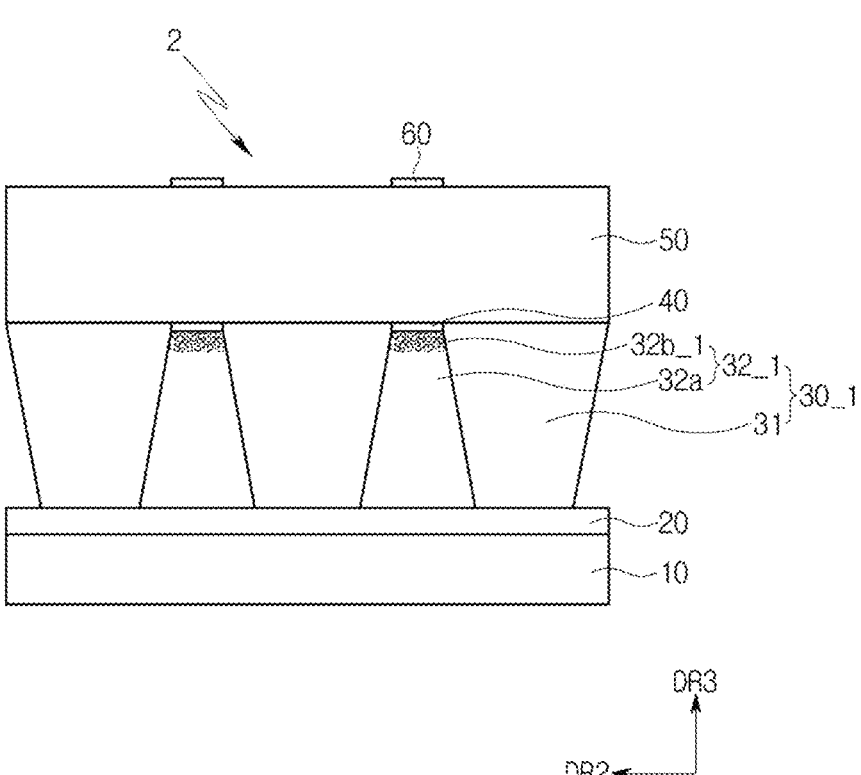
FIG. 9 is a cross-sectional view of a light path control member according to another embodiment in a first mode.
Figure 10:
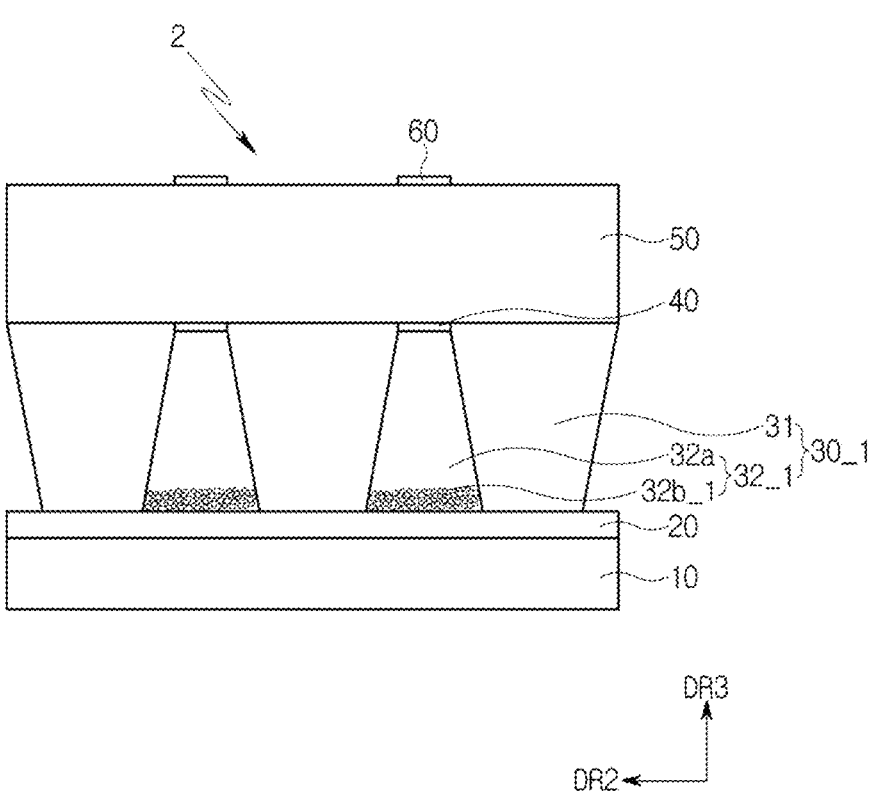
FIG. 10 is a cross-sectional view of the light path control member in FIG. 9 in a second mode.
Figure 11:
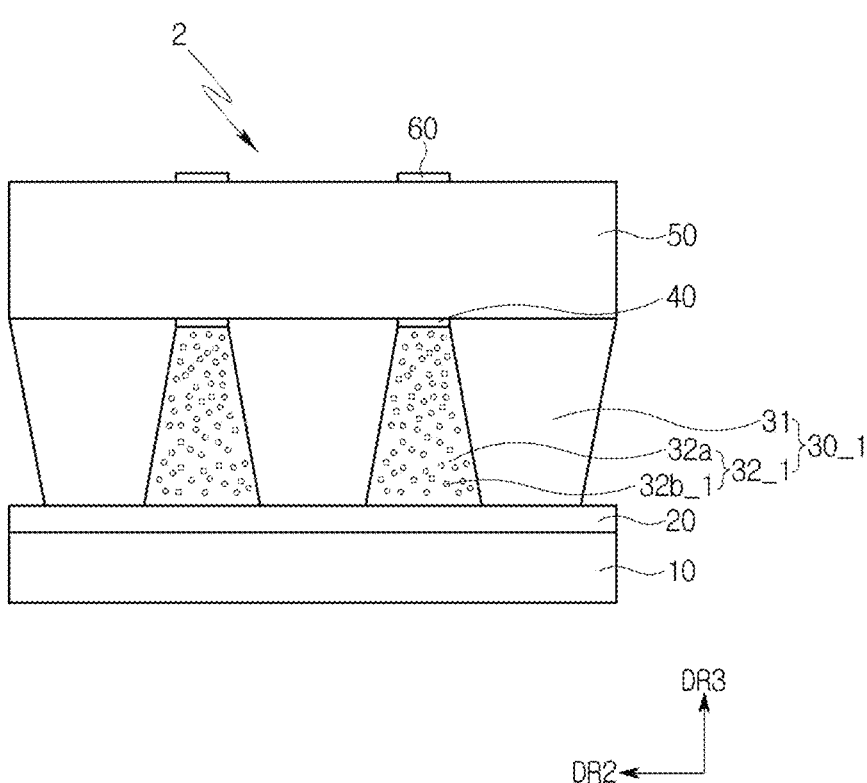
FIG. 11 is a cross-sectional view of the light path control member in FIG. 9 in a third mode.

FIG. 9 is a cross-sectional view of a light path control member according to another embodiment in a first mode. FIG. 10 is a cross-sectional view of the light path control member in FIG. 9 in a second mode. FIG. 11 is a cross-sectional view of the light path control member in FIG. 9 in a third mode.

Referring to FIGS. 9 to 11, a light path variable part 32_1 of a light conversion unit 30_1 of a light path control member 2 according to the present embodiment is different from the light path control member 1 in FIGS. 1 to 3 in that it does not include the additive included in the light path variable part 32 in order to maintain the second mode in the third mode, as described above with reference to FIGS. 2 and 3.

More specifically, since the light path variable part 32_1 does not include the additive, the light absorbing particles 32*b*_1 may be dispersed and disposed in the dispersion solution 32*a* in the third mode in which no voltage is applied to the electrodes 20, 40 as illustrated in FIG. 11. That is, in the light path control member 2 according to the present embodiment, the behaviors of the light absorbing particles 32*b*_1 in the second mode (see FIG. 10) and the third mode (see FIG. 11) may be different from each other. Even in the third mode, since the light absorbing particles 32*b*_1 are dispersed and disposed in the dispersion solution 32*a*, it can serve to limit the side viewing angle.

Other descriptions have been described above with reference to FIGS. 1 to 3, so detailed descriptions thereof will be omitted.

Figure 12:
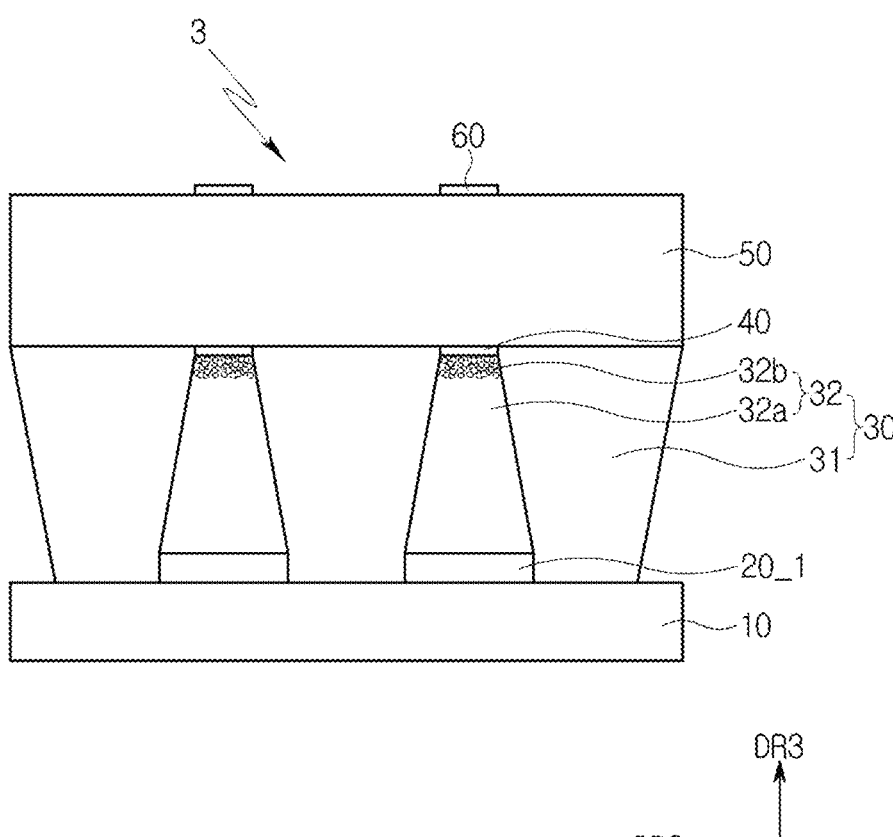
FIG. 12 is a cross-sectional view of a light path control member according to still another embodiment.

FIG. 12 is a cross-sectional view of a light path control member according to still another embodiment.

Referring to FIG. 12, a light path control member 3 according to the present embodiment is different from the light path control member 1 in FIG. 2 in that a first electrode 20_1 is not formed as a surface electrode but is provided in plurality.

More specifically, the first electrodes 20_1 according to the present embodiment may be provided in plurality, and the plurality of first electrodes 20_1 may be spaced apart from each other and disposed in the second direction DR2. Each of the plurality of first electrodes 20_1 may overlap the second electrodes 40 in the thickness direction.

Other descriptions have been described above with reference to FIGS. 1 to 3, so detailed descriptions thereof will be omitted.

Figure 13:
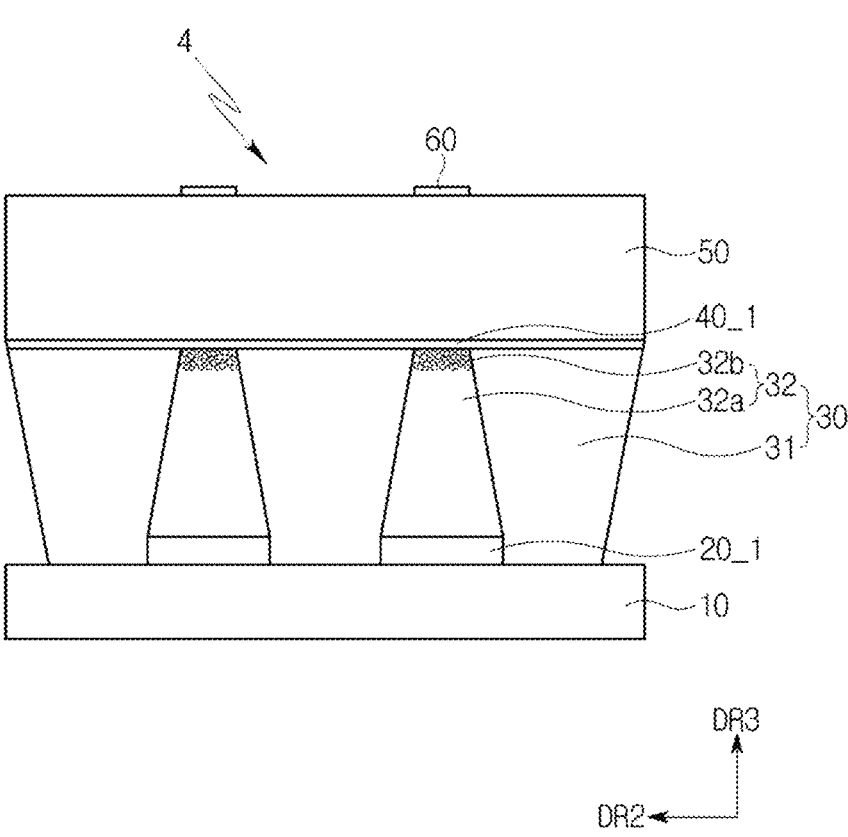
FIG. 13 is a cross-sectional view of a light path control member according to still another embodiment.

FIG. 13 is a cross-sectional view of a light path control member according to still another embodiment.

Referring to FIG. 13, a light path control member 4 according to this embodiment is different from the light path control member 3 in FIG. 12 in that a second electrode 401 is provided in the form of a surface electrode.

More specifically, the second electrode 40_1 according to the present embodiment may include a transparent conductive material. For example, the second electrode 401 may include a metal oxide such as indium tin oxide, indium zinc oxide, copper oxide, tin oxide, zinc oxide, and titanium oxide.

The second electrode 40_1 may be disposed on the second substrate 50 in a film shape. In addition, the light transmittance of the second electrode 40_1 may be about 80% or more. In more detail, the second electrode 40_1 may be disposed on the entire surface of one surface of the second substrate 50. That is, the second electrode 40_1 may be disposed as a surface electrode on the second substrate 50.

Other descriptions are described above with reference to FIG. 12, so detailed descriptions thereof will be omitted.

Figure 14:
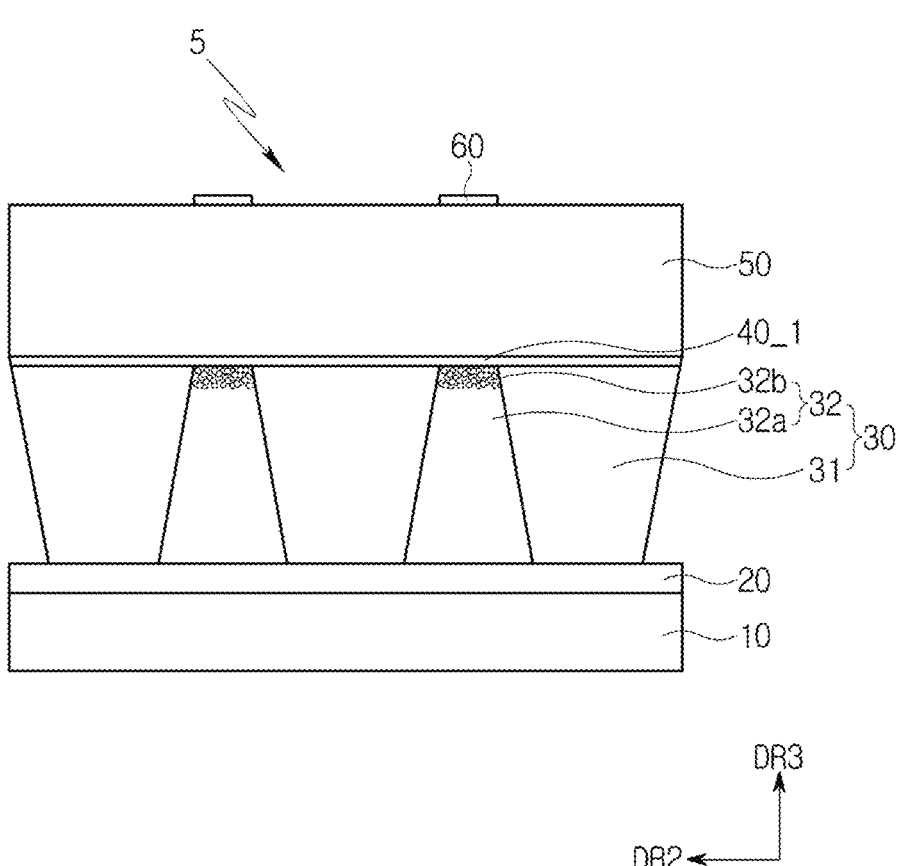
FIG. 14 is a cross-sectional view of a light path control member according to still another embodiment.

FIG. 14 is a cross-sectional view of a light path control member according to still another embodiment.

Referring to FIG. 14, a light path control member 5 according to the present embodiment is different from the light path control member 4 in FIG. 13 in that the first electrode 20 is disposed as a surface electrode as in FIG. 2.

Other descriptions are described above with reference to FIG. 13, so detailed descriptions thereof will be omitted.

Figure 15:
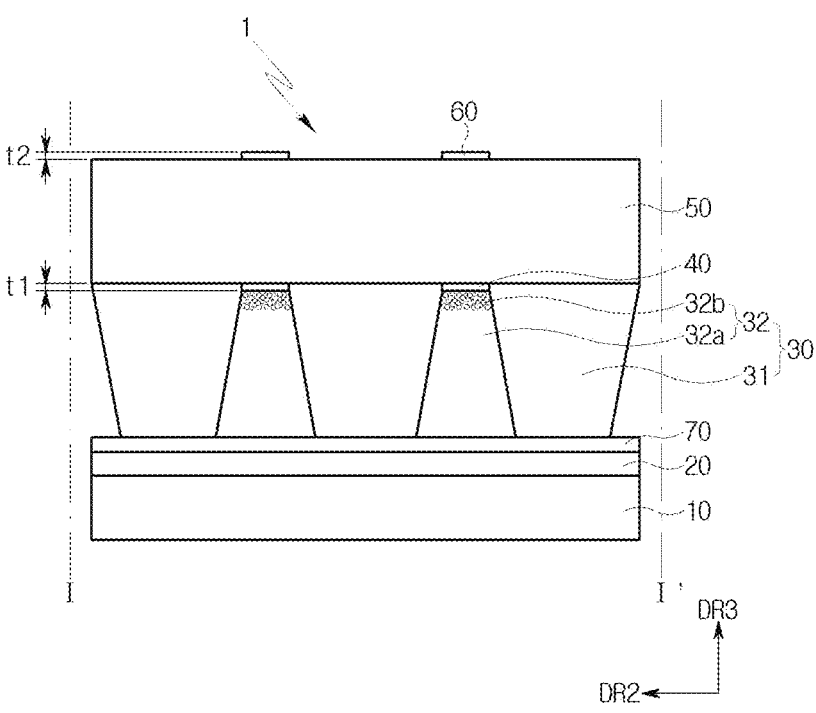
FIG. 15 is a cross-sectional view of a light path control member according to still another embodiment.

FIG. 15 is a cross-sectional view of a light path control member according to still another embodiment.

Referring to FIG. 15, it is different from the embodiment in FIG. 2 in that a separate adhesive layer 70 may be disposed between the first electrode 20 and the light conversion unit 30. The adhesive layer 70 may include a light transparent adhesive (OCA), a light transparent resin (OCR), or the like but is not limited thereto.

Figure 16:
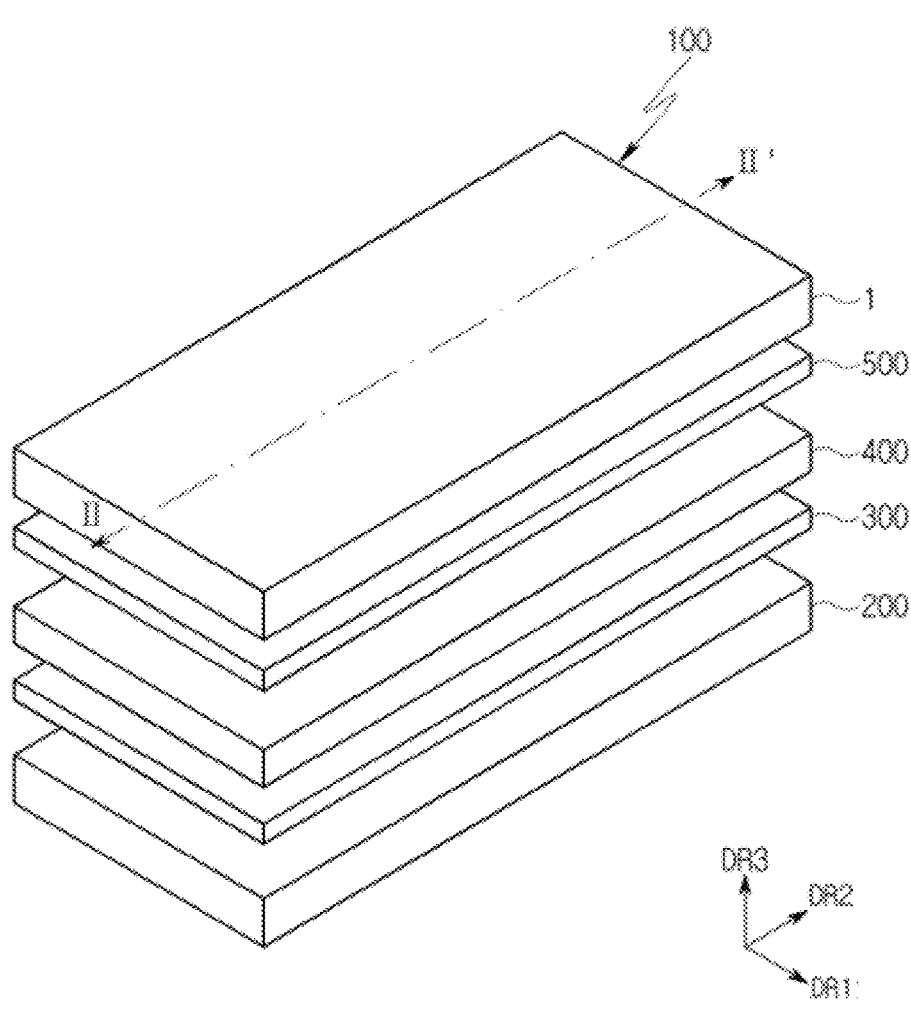
FIG. 16 is a perspective view of a display device according to an embodiment.
Figure 17:
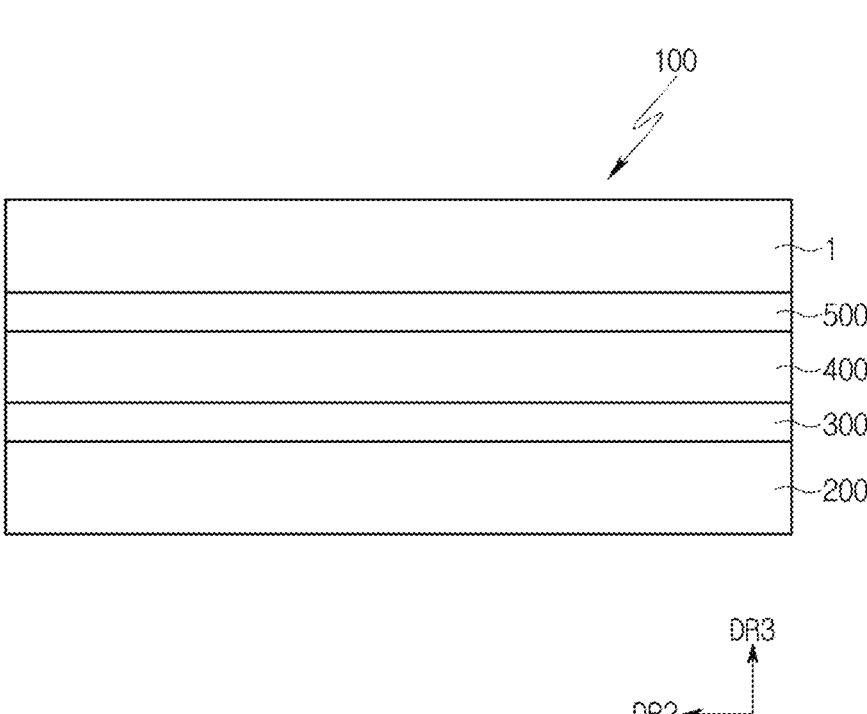
FIG. 17 is a cross-sectional view taken along line II-II' in FIG. 16.

FIG. 16 is a perspective view of a display device according to an embodiment. FIG. 17 is a cross-sectional view taken along line II-II' in FIG. 16.

Referring to FIGS. 16 and 17, a display device 100 according to an embodiment may include a display panel 200 disposed on a lower part of the light path control member 1, a first coupling member 300 between the display panel 200 and the light path control member 1, a polarization film 400 between the first coupling member 300 and the light path control member 1, and a second coupling member 500 between the polarization film 400 and the light path control member 1.

The display panel 200 and the polarization film 400 may be coupled through the first coupling member 300, and the polarization film 400 and the light path control member 1 may be coupled through the second coupling member 500.

The first coupling member 300 may include a light transparent adhesive (OCA), a light transparent resin (OCR), or the like, but is not limited thereto.

The second coupling member 500 may include a light transparent adhesive (OCA), a light transparent resin (OCR), or the like, but is not limited thereto.

The display panel 200 may include a plurality of pixels disposed in a display area of a base substrate and driving units disposed in a non-display area around the display area to drive the pixels. The pixels may include transistors (TFTs) connected to the driving units through a control signal line, and light emitting elements (OLEDs) connected to the transistors. The transistors are turned on or off according to a control signal applied through the control signal line to adjust the amount of current applied to the light emitting element. The light emitting element may emit light with a luminance corresponding to the amount of current applied through the transistor. The display panel 200 may further include a protective layer (Encap) encapsulating the light emitting elements (OLEDs) and an upper protective substrate (Pol). In some embodiments, the display panel 200 may be a liquid crystal display panel.

Although the embodiments of the disclosure have been described above with reference to the accompanying drawings, it will be understood that the technical configuration of the present disclosure may be embodied in other specific forms by those skilled in the art to which the disclosure pertains without changing the technical spirit or essential features of the disclosure. Therefore, it should be understood that the embodiments described above are illustrative in all respects and not restrictive.

can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A light path control member, comprising:
a first substrate;
a first electrode disposed on the first substrate;
a light conversion unit disposed on the first electrode;
a second substrate disposed on the light conversion unit;
a second electrode disposed between the second substrate and the light conversion unit; and
a barrier disposed on an upper surface of the second substrate,
wherein:
the barrier is provided in plural;
each of a plurality of barriers extends in a first direction,
the plurality of barriers is spaced apart from each other in a second direction;
one end of each barrier in the first direction is aligned with one end of the second substrate, and an opposite end of each barrier in the first direction is aligned with an opposite end of the second substrate in the second direction;
the second electrode is provided in plural, and each of a plurality of second electrodes overlaps light path variable parts in a thickness direction; and
the plurality of second electrodes corresponds respectively to the plurality of barriers, and the plurality of second electrodes each extend in the first direction.

2. The light path control member of claim 1, wherein the light conversion unit includes a light transmission part and a light path variable part around the light transmission part.

3. The light path control member of claim 2, wherein the light path variable part changes a path of light provided according to the voltage application.

4. The light path control member of claim 2, wherein the light path variable part includes a dispersion solution and light absorbing particles in the dispersion solution.

5. The light path control member of claim 4, wherein in a first mode, the light absorbing particles are disposed adjacent to the second electrode.

6. The light path control member of claim 5, wherein in the first mode, a (+) voltage is applied to the second electrode and a (−) voltage is applied to the first electrode.

7. The light path control member of claim 5, wherein in a second mode, the light absorbing particles are disposed adjacent to the first electrode.

8. The light path control member of claim 7, wherein in the second mode, a (−) voltage is applied to the second electrode and a (+) voltage is applied to the first electrode.

9. The light path control member of claim 7, wherein in a third mode, the light absorbing particles are disposed adjacent to the first electrode, and in the third mode, no voltage is applied to each of the first electrode and the second electrode.

10. The light path control member of claim 7, wherein in a third mode, the light absorbing particles are dispersed in the dispersion solution.

11. The light path control member of claim 2, wherein the light path variable part is provided in plurality, and on a plane, the light transmission part is disposed between adjacent light path variable parts.

12. The light path control member of claim 11, wherein the second electrode includes a light absorbing material.

13. The light path control member of claim 11, wherein the barrier includes a light absorbing material.

14. The light path control member of claim 13, wherein the barrier is provided in plurality, and each of the plurality of the barriers overlaps the light path variable parts in a thickness direction.

15. The light path control member of claim 1, wherein a thickness of the barrier is 30 nm to 50 nm.

16. The light path control member of claim 1, wherein a thickness of the second electrode is smaller than a thickness of the barrier.

17. A display device, comprising:
a display panel; and
a light path control member on the display panel, the light path control member comprising:
a first substrate,
a first electrode disposed on the first substrate,
a light conversion unit disposed on the first electrode,
a second substrate disposed on the light conversion unit,
a second electrode disposed between the second substrate and the light conversion unit, and
a barrier disposed on an upper surface of the second substrate,
wherein,
the barrier is provided in plural;
each of a plurality of barriers extends in a first direction;
the plurality of barriers are spaced apart from each other in a second direction;
one end of each barrier in the first direction is aligned with one end of a second substrate, and an opposite end of each barrier in the first direction is aligned with an opposite end of the second substrate in the second direction;
the second electrode is provided in plural, and each of a plurality of second electrodes overlaps light path variable parts in a thickness direction; and
the plurality of second electrodes corresponds respectively to the plurality of barriers, and the plurality of second electrodes each extend in the first direction.

18. The display device of claim 17, further comprising a polarization film between the display panel and the light path control member.

19. The display device of claim 17, wherein the light conversion unit includes a light transmission part and a light path variable part around the light transmission part, and the light path variable part changes a path of light provided according to voltage application.

* * * * *